United States Patent [19]
Yoo

[11] Patent Number: 6,045,475
[45] Date of Patent: Apr. 4, 2000

[54] CONTROLLER FOR A CHANGEABLE PEDALING SYSTEM IN A BI-DIRECTIONAL PEDALING BICYCLE

[75] Inventor: Moon-Soo Yoo, Chungcheoungbuk-do, Rep. of Korea

[73] Assignee: World Industry Co., Ltd., Chungcheongbuk-do, Rep. of Korea

[21] Appl. No.: 09/000,921

[22] Filed: Dec. 30, 1997

[30] Foreign Application Priority Data

Dec. 30, 1996 [KR] Rep. of Korea ...................... 96-82480

[51] Int. Cl.[7] .................................................. B62M 11/14
[52] U.S. Cl. .............................................. 475/12; 475/296
[58] Field of Search .............................. 475/12, 294, 296, 475/297; 74/810.1

[56] References Cited

U.S. PATENT DOCUMENTS

| | | | |
|---|---|---|---|
| 399,003 | 3/1889 | Bentley | 475/12 X |
| 479,177 | 7/1892 | Vogel | 74/810.1 X |
| 3,915,260 | 10/1975 | Kim | 74/810.1 X |
| 4,667,934 | 5/1987 | Ottemann | 475/12 X |
| 5,141,476 | 8/1992 | Chang | 475/297 |
| 5,368,279 | 11/1994 | Ottemann et al. | 74/810.1 X |
| 5,647,817 | 7/1997 | Chang | 475/296 X |

FOREIGN PATENT DOCUMENTS

| | | | |
|---|---|---|---|
| 97/21587 | 6/1997 | WIPO | 475/12 |

*Primary Examiner*—Khoi Q. Ta
*Attorney, Agent, or Firm*—Lowe Hauptman Gopstein Gilman & Berner

[57] ABSTRACT

A controller for changeable pedaling system of a bi-directional pedaling bicycle is provided. The controller for changeable pedaling system includes: changing stoppers formed to be rotatable around fixing shafts arranged in a carrier with a predetermined interval, each having a first protrusion pin formed at one side of an end near the fixing shaft, and a second protrusion pin at the other side of the other end; a slide ring connected to the first protrusion pins of the changing stoppers and connected to a sun gear being slidably rotatable, for setting the changing stoppers of the carrier to a ratchet tooth of a fixing housing and a ratchet tooth portion of the sun gear according to the rotation of the sun gear; an operation lever controllable from the outside, having rotatable restoring force with being connected to a shaft of a lever gear formed in one side of the fixing housing; a first control ring having inner slant protrusions in an inner flange and outer slant protrusions in an outer flange, with a predetermined interval, the first control ring to be rotatable being engaged with the lever gear; a second control ring having a stopper bar controlling the operation lever and two-sided slant protrusions along the inner circumference with a predetermined interval, the second control ring being elastically coupled to constraint the first control ring, thereby transmitting elastic force toward the second protrusion pins of the changing stoppers; and a third control ring having slipping slant protrusions in the inner circumference, the third control ring being installed to be horizontally movable by the first control ring to constraint the second protrusion pins of the changing stoppers, thereby preventing the changing stoppers from being engaged with the ratchet tooth of the fixing housing.

10 Claims, 14 Drawing Sheets

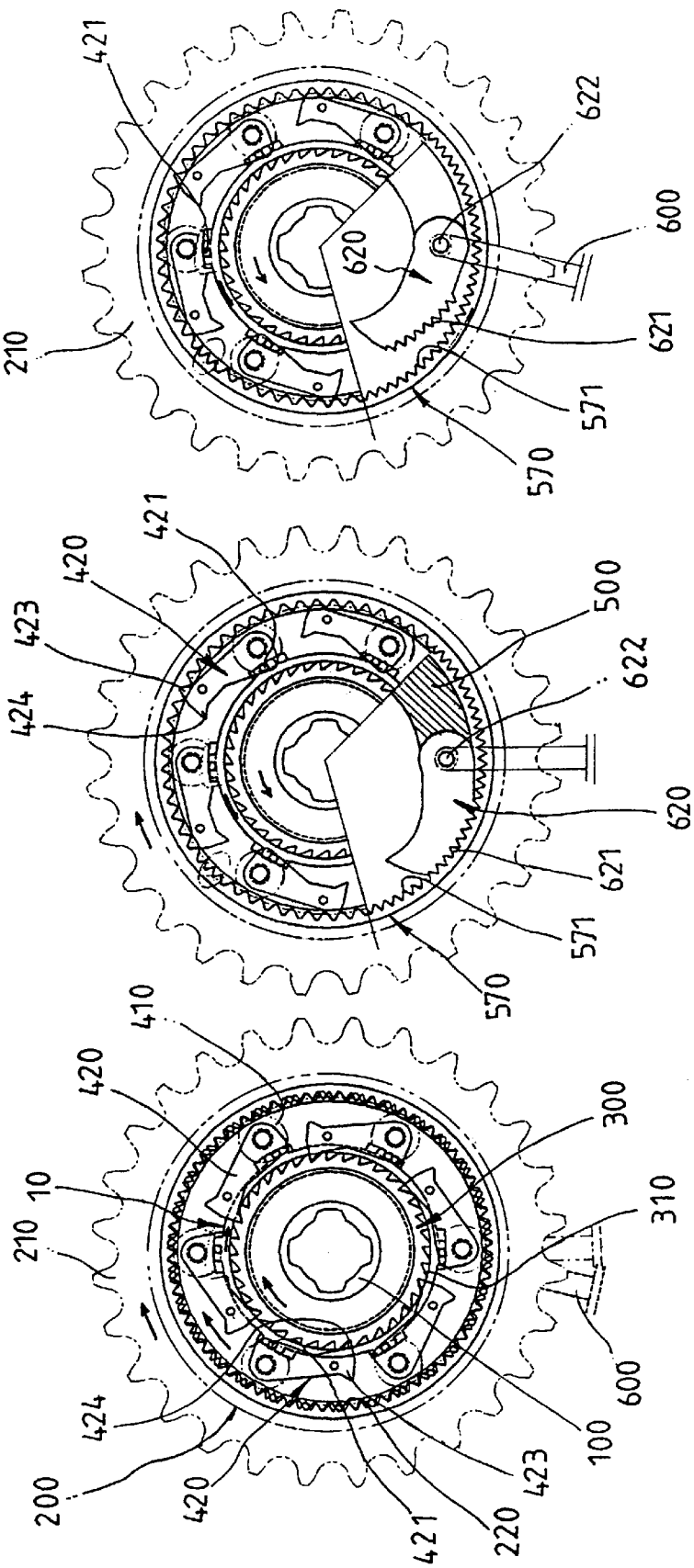

CONTROLLER FOR A CHANGEABLE PEDALING SYSTEM IN A BI-DIRECTIONAL PEDALING BICYCLE

TECHNICAL FIELD

The present invention relates to a controller for a changeable pedaling system of a bi-directional pedaling bicycle which is capable of being driven forward by pedaling of a crank shaft (pedal shaft) in both forward and rearward direction, in which the bicycle can run idle as in a conventional one-directional pedaling bicycle by driving the pedal shaft rearward, and when a rider drives the pedal shaft forward after pedaling once rearward, while the bicycle travels forward, by using an operation lever, the bi-directional pedaling system of the bicycle returns to the initial conventional one-directional pedaling system including idling by rearward pedaling.

BACKGROUND ART

According to a pedaling system of a conventional bicycle, as a rider pedals forward, a driving sprocket of a pedal shaft rotates forward, and the forward rotation of the driving sprocket is transmitted to a driven sprocket connected to the driving sprocket by a chain. As a result, the driven sprocket also rotates forward and a rear wheel rotates forward, thereby driving the bicycle forward.

When the rider pedals rearward, the driving sprocket rotates rearward, so that the driven sprocket also rotates rearward. Since a one-directional clutch is connected to the driven sprocket, a bobbin of a rear shaft runs idle, as that a driving force is not transmitted to the rear wheel. Thus, the driving force of the bicycle is lost.

The above conventional bicycle can travel forward only by pedaling forward, and it is impossible to drive the bicycle forward by pedaling rearward.

A bi-directional pedaling apparatus for a bicycle which is capable of traveling forward by pedaling rearward is disclosed in Korea Patent Publication No. 95-13589 by the present applicant.

In the bi-directional pedaling apparatus, a driving sprocket is fixed to a pedal shaft by an one-directional clutch bearing, and a series of gears are differently engaged by selective operation of an operation lever located at a handle of the bicycle.

The gears include idle gears rotatably installed in a carrier, a gear wheel and a transfer wheel which are engaged each other. The gear wheel is connected to a driving sprocket to be detachable therefrom, and the transfer wheel is connected to a one-directional clutch bearing or a pedal shaft to be detachable therefrom. Forward pedaling of the pedal shaft is directly transmitted to the driving sprocket via the one-directional clutch bearing, and rearward pedaling of the pedal shaft is changed forward in the gear wheel via the transfer wheel and the idle gears so that forward driving is transmitted to the driving sprocket.

The operation lever is connected to the series of the gears including the transfer wheel, idle gears and gear wheel by a wire, so that the idle gears and the transfer wheel are engaged each other. The engagement between the idle gears and the transfer wheel by the operation of the operation lever is not smooth. Also, since the operation lever is operated by pulling force, it is not easy to operate the operation lever. In addition, when pulling backward the bicycle while setting the bicycle to the bi-directional pedaling system, the bicycle cannot be pulled due to the engagement of the internal gears without rotation thereof.

DISCLOSURE OF THE INVENTION

To solve the above problems, it is an object of the present invention to provide a controller for a changeable pedaling system of a bi-directional pedaling bicycle which is capable of driving forward by pedaling a crank shaft (pedal both forward and rearward, in which the bicycle can run idle as in a conventional one-directional pedaling bicycle by driving the pedal shaft rearward, and when a rider drives the pedal shaft forward after pedaling once rearward, while the bicycle travels forward, by using an operation lever, the bi-directional pedaling system of the bicycle returns to the initial conventional one-directional pedaling system including idling by the rearward pedaling.

According to the object of the present invention, there is provided a controller for a changeable pedaling system in a bicycle having a bi-directional pedaling apparatus which includes a pedal shaft rotatable by pedaling, a sun gear rotatable together with the pedal shaft, a carrier having a plurality of planetary gears to be engaged with the sun gear, and changing stoppers, a fixing housing having a ratchet tooth to which the changing stoppers of the carrier is to be fixed being engaged to each other, and a sprocket binding housing connected to a sprocket to be engaged with the planetary gears of the carrier. The controller comprises the changing stoppers formed to be rotatable around fixing shafts arranged in the carrier with a predetermined interval, each having a first protrusion pin formed at one side of an end near the fixing shaft, and a second protrusion pin at the other side of the other. A slide ring is connected to the first protrusion pins of the changing stoppers and connected to the sun gear being slidably rotatable, for setting the changing stoppers of the carrier to the ratchet tooth of the fixing housing and a ratchet tooth portion of the sun gear according to the rotation of the sun gear; an operation lever controllable from the outside, having rotatable restoring force with being connected to a shaft of a lever gear formed in one side of the fixing housing; a first control ring having inner slant protrusions in an inner flange and outer slant protrusions in an outer flange, with a predetermined interval, the first control ring to be rotatable being engaged with the lever gear; a second control ring having a stopper bar controlling the operation lever and two-sided slant protrusions along the inner circumference with a predetermined interval, the second control ring being elastically coupled to constraint the first control ring, thereby transmitting elastic force toward the second protrusion pins of the changing stoppers; and a third control ring having slipping slant protrusions in the inner circumference, the third control ring being installed to be horizontally movable by the first control ring to constraint the second protrusion pins of the changing stoppers, thereby preventing the changing stoppers from being engaged with the ratchet tooth of the fixing housing.

BRIEF DESCRIPTION OF THE DRAWINGS

FIG. 12 is a diagram showing the major portions of FIG. 9 in a forward pedaling state;

FIG. 13 is a diagram showing the major portions of FIG. 9 in a forward driving state by a rearward pedaling; and FIG. 14 is a diagram showing the major portions of FIG. 9 in an idling state by the reward pedaling.

BEST MODE FOR CARRYING OUT THE INVENTION

<Embodiment 1>

Figure 1:
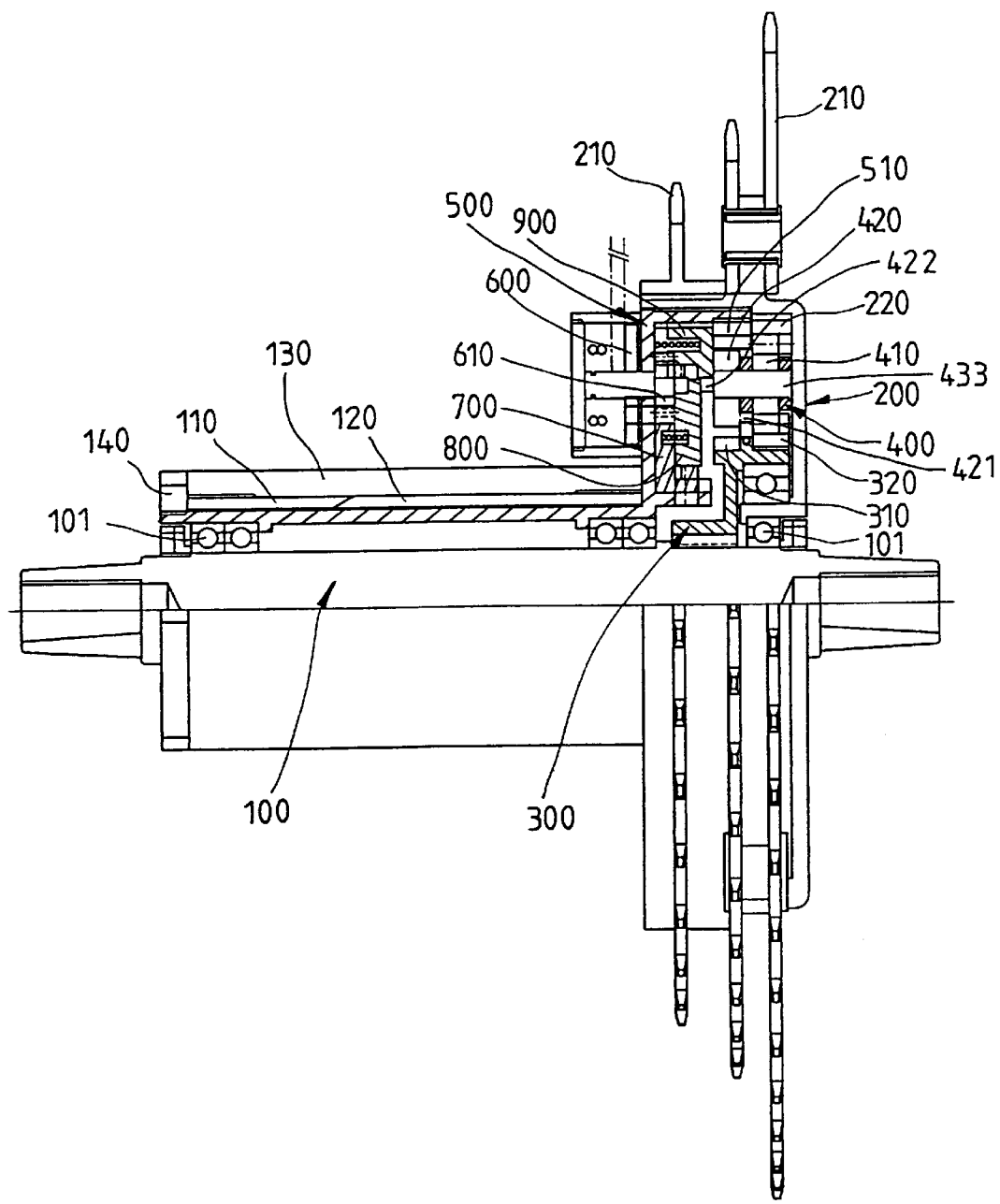
FIG. 1 is a sectional view of a controller for a changeable pedaling system of a bi-directional pedaling bicycle according to a preferred embodiment of the present invention.

A controller for a changeable pedaling system of a bi-directional pedaling bicycle according to the present invention includes a sprocket binding housing 200, a sun gear 300, a carrier 400 and a fixing housing 500 at one side of a pedal shaft 100, wherein an operation lever 600, a first control ring 700, a second control ring 800 and a third control ring 900 are coupled within the fixing housing 500.

As shown in FIG. 1, the sprocket binding housing 200 is cylindrical, such that the sun gear 300, the carrier 400 and the fixing housing 500 are coupled therein. Sprocket binding housing 200 is rotatably connected to the pedal shaft 100 by bearings 101, and a plurality of driving sprockets 210 are fixed to its outer circumference.

A ring gear 220 is integrally formed along the inner circumference of the sprocket binding housing 200 or fixed thereto by insertion, such that the ring gear 220 can operate in gear with planetary gears 410 of the carrier 400 to be explained later.

Figure 2A:
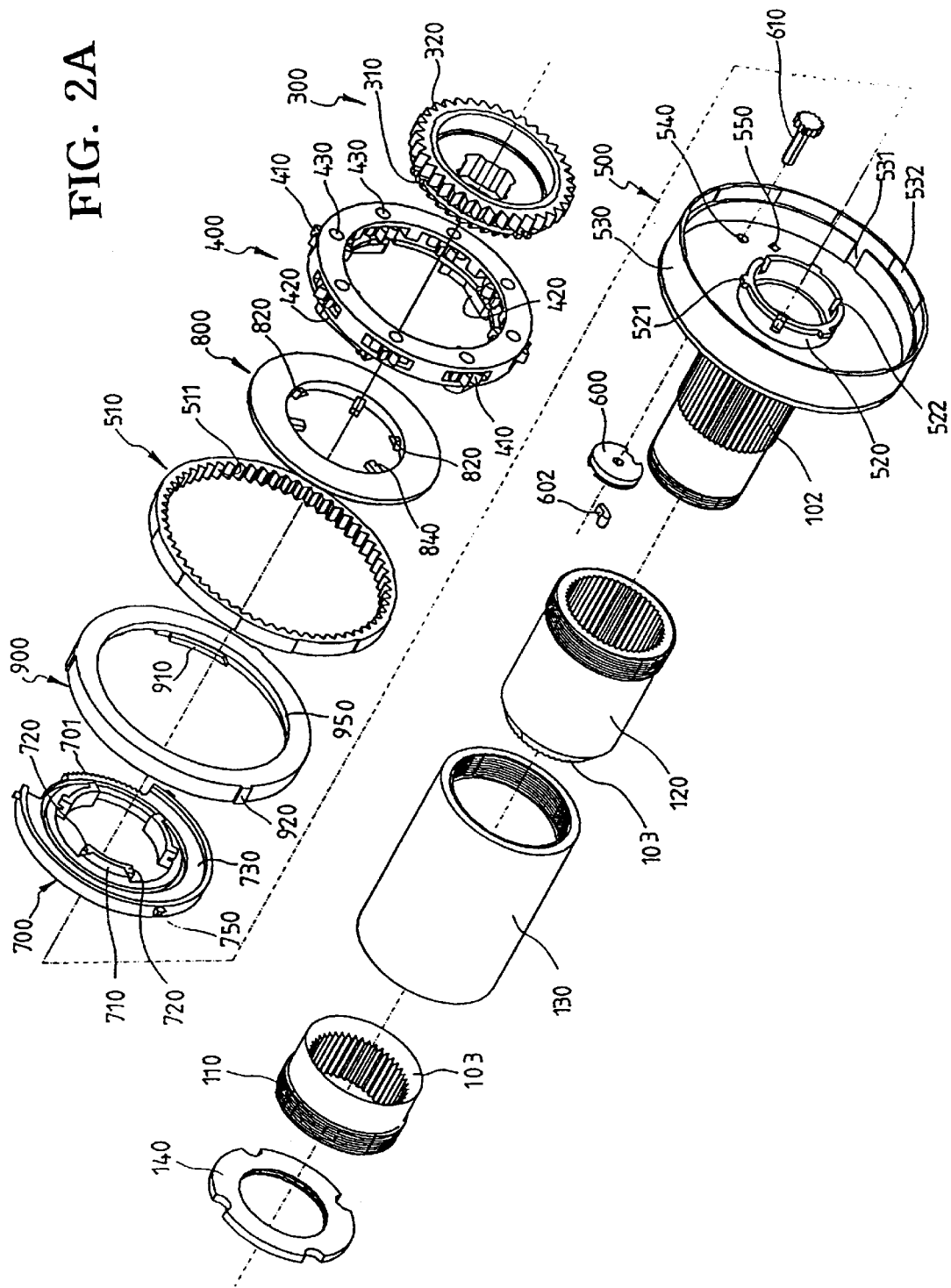
FIGS. 2A and 2B are perspective views of the controller for the changeable pedaling system in FIG. 1, in the left and right directions.
Figure 2B:
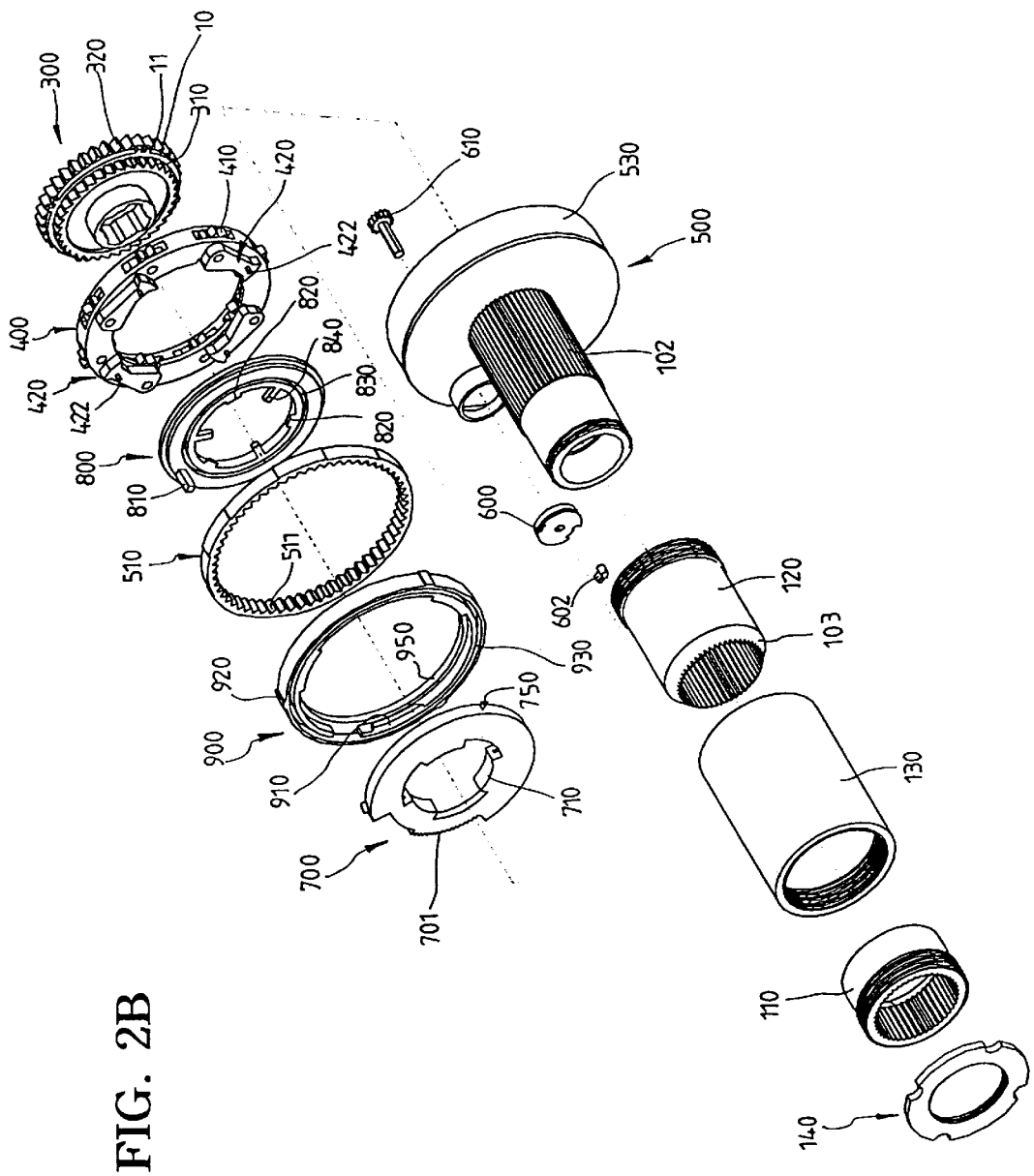

The fixing housing 500 is cylindrical and is coupled with the sprocket binding housing 200, with the operation lever 600, the first control ring 700, the second control ring 800 and the third control ring 900 coupled therein as shown in FIGS. 2A and 2B. The interior of housing 500 is connected to the pedal shaft 100 by the bearings 101 to be slidably rotatable, and a slip preventing means 102 such as a spline is formed around the outer circumference of the cylindrical portion. Also, first and second cylindrical fixing nuts 110 and 120 are connected thereto and covered with a cylindrical cover 130, and a fixing means 140 such as nut is fitted to that assembly.

The cylindrical portion of the fixing housing 500 is connected to the first and second cylindrical fixing nuts 110 and 120 which are closely coupled each other at their slant portions 103, and this assembly is covered with the cylindrical cover 130 at the same time, thereby being fixed to a frame (not shown) of the bicycle.

As shown in FIGS. 1, 2A and 2B, the sun gear 300 is fixed to the pedal shaft 100 to be rotatable together with the pedal shaft 100. Also, a ratchet tooth portion 310 and a gear portion 320 are formed around the outer circumference of the sun gear 300. The ratchet tooth portion 310 is entangled with changing stoppers 420 of the carrier 400, and the gear portion 320 is engaged with the planetary gears 410 of the carrier 400 to be rotatable.

As shown in FIGS. 1, 2A and 2B, the carrier 400 is connected between the sprocket binding housing 200 and the sun gear 300. The carrier 400 has a plurality of planetary gears 410 arranged with a predetermined interval which are rotatably engaged with the ring gear 220 of the sprocket binding housing 200 and the gear portion 320 of the sun gear 300, and coupled with each fixing shaft 430 to be rotatable.

Figure 3:
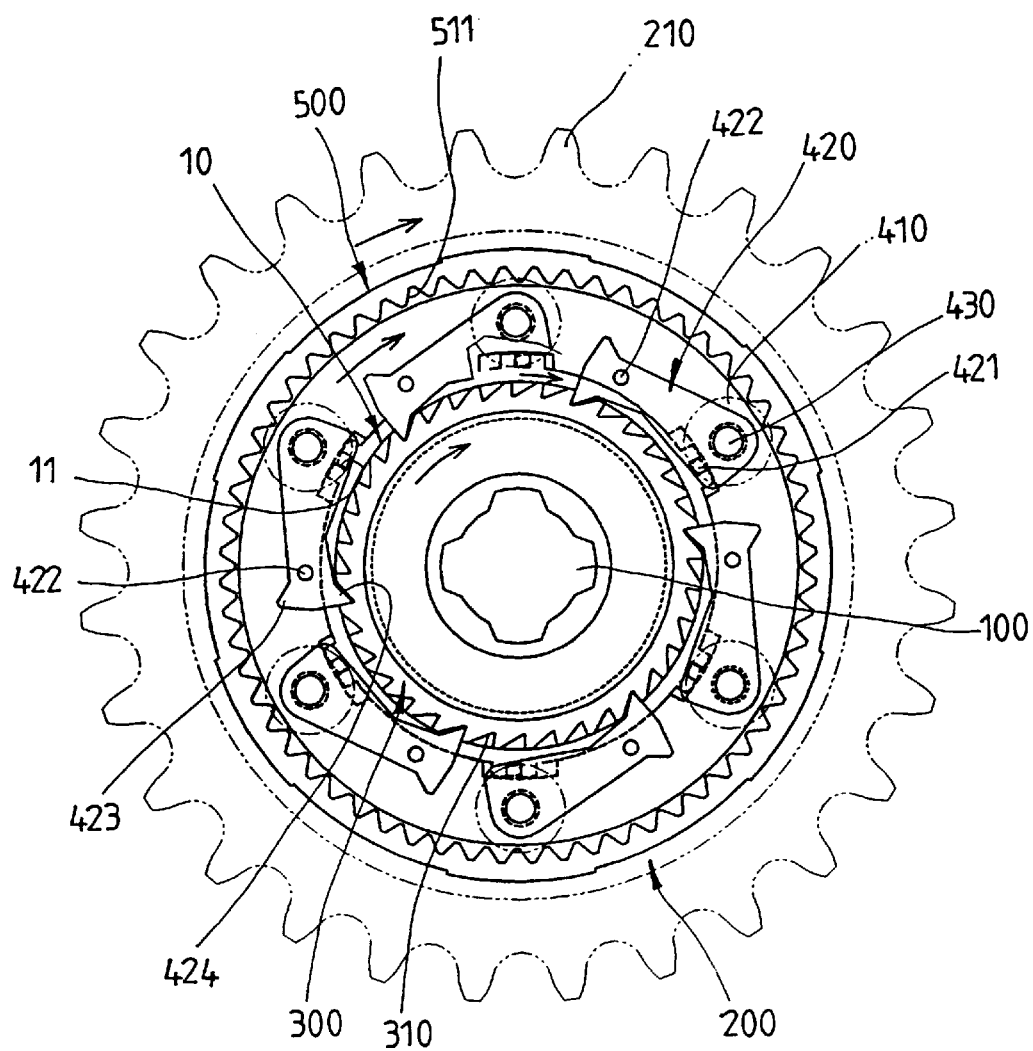
FIG. 3 is a diagram showing a state where a sun gear, a carrier, a fixing housing and a driving sprocket of the present invention are combined in a forward pedaling state.
Figure 4:
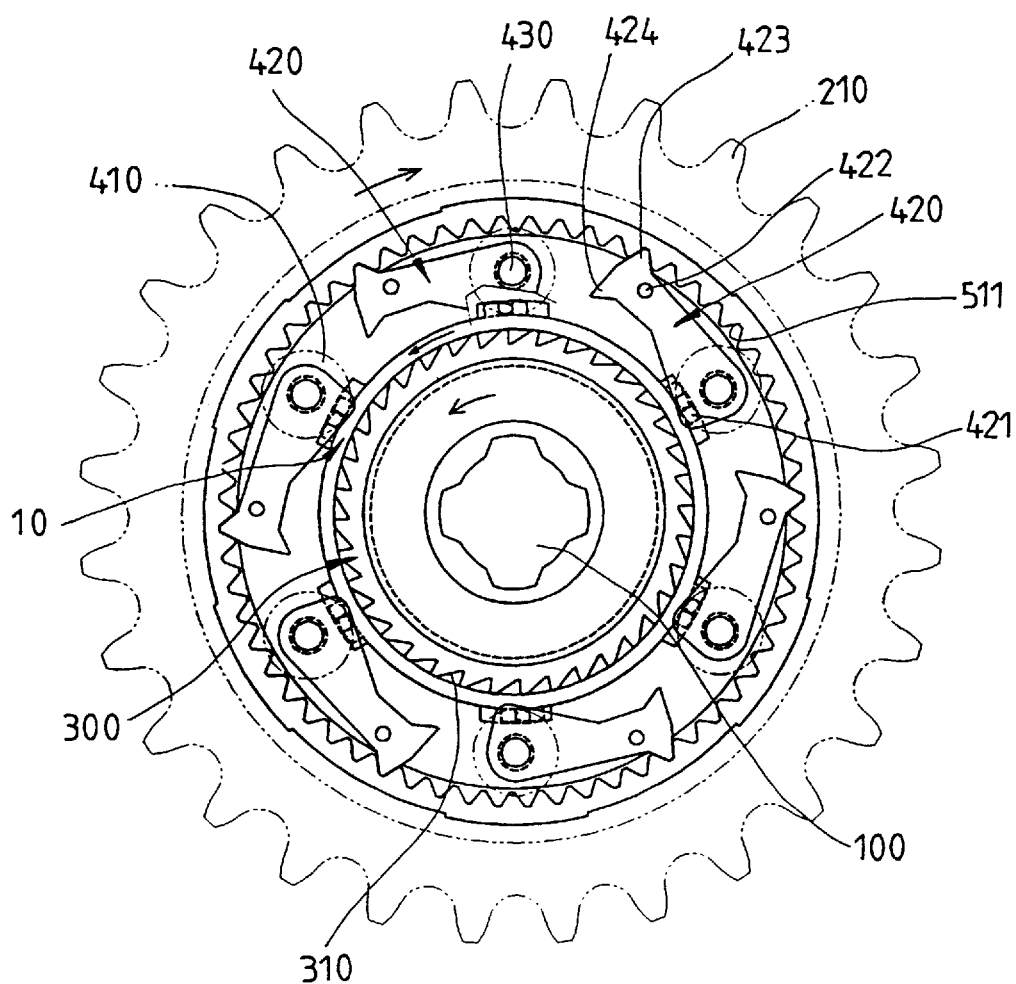
FIG. 4 is a diagram showing a state where the sun gear, carrier, fixing housing and drive sprocket according to the present invention are combined in a rearward pedaling state.
Figure 8A:
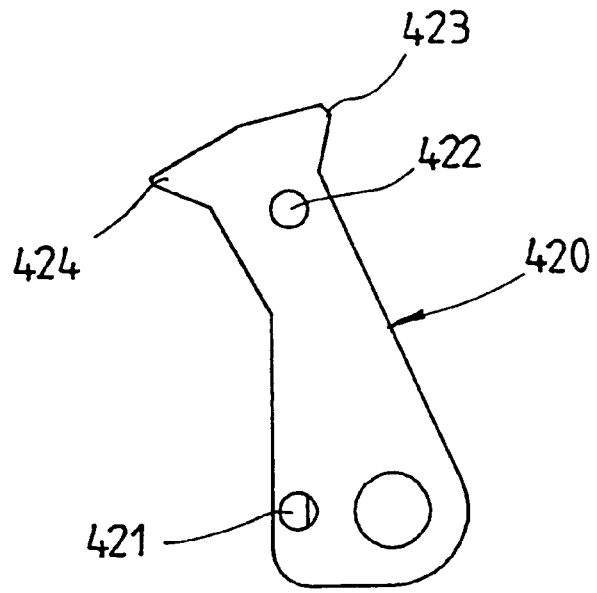
FIGS. 8A and 8B are a front view and a sectional view of the changing stopper of the controller for a changeable pedaling system.
Figure 8B:
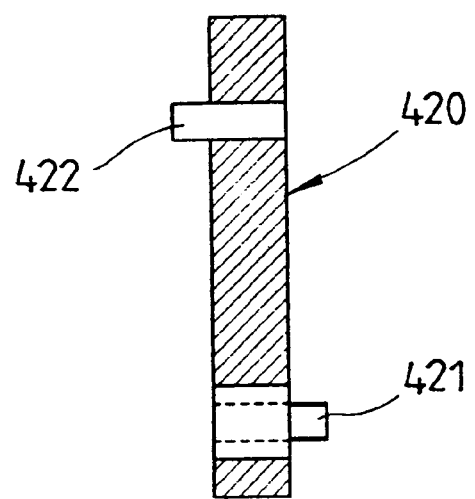

As depicted in FIG. 3 the changing stoppers 420 are rotatably connected to the fixing shafts 430 of the carrier 400. Each changing stopper 420 has a first protrusion pin 421 at one side of an end near the fixing shaft 430, and upper and lower holding jaws 423 and 424 like a tip at the other end thereof as shown in FIGS. 3, 4 and 8. Also, a second protrusion pin 422 is formed near the end having the holding jaws at the opposite side to the side with the first protrusion pin 421.

Figure 7A:
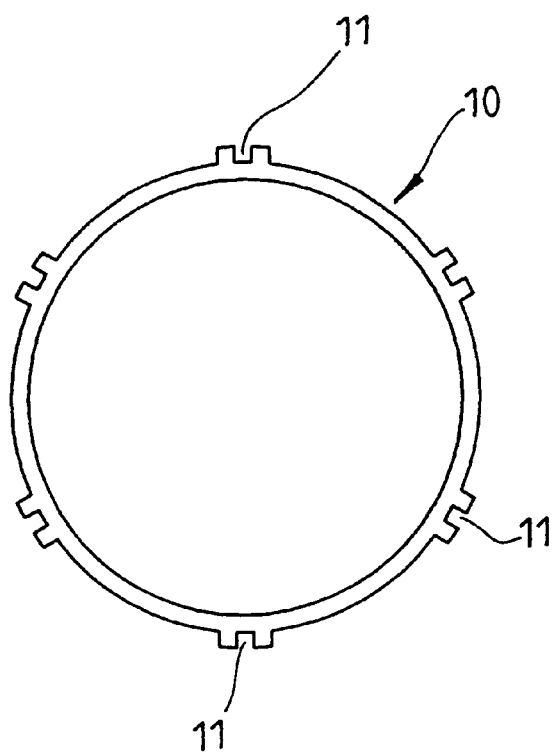
FIGS. 7A and 7B are a front view and a sectional view of the slide ring of the controller for a changeable pedaling system.
Figure 7B:
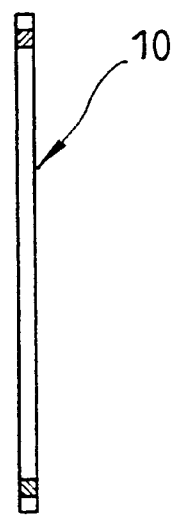

Each first protrusion pin 421 of the changing stoppers 420 is coupled to a flute 11 of a slide ring 10 shown in FIGS. 2B and 7A, 7B which is slidably connected to the sun gear 300.

The slide ring 10 is connected to be slidably rotatable between the ratchet tooth portion 310 and the gear portion 320 of the sun gear 300. Thus, together with the rotation of the sun gear 300, the upper and lower holding jaws 423 and 424 of the changing stopper 420 of the carrier 400 are entangled with a ratchet tooth 511 of the fixing housing 500 and the ratchet tooth portion 310 of the sun gear 300, respectively.

As described above, the cylindrical portion of the fixing housing 500 is slidably connected to the pedal shaft 100 by the bearings 101 and covered with the cylindrical cover 130 fixed to the frame (not shown) of the bicycle. A flange portion of the fixing housing 500, which has the shape of a cylindrical cap and is integrally formed with the cylindrical portion, is constituted by an inner flange 520 with a predetermined diameter and an outer flange 530 having a larger diameter than the inner flange 520 as shown in FIGS. 2A and 2B.

The inner flange 520 has stopping protrusion 521 and slide flutes 522 which are alternately arranged with a predetermined interval, and connected to the first control ring 700 and the second control ring 800. Here, the first control ring 700 is connected to the inner flange 520 to be rotatable by a predetermined distance around the inner flange 520, and the second control ring 800 is connected thereto to be movable by a predetermined distance in the shaft direction, i.e., vertical direction, of the inner flange 520.

Also, the outer flange 530 has inner slide flutes 531 at its inner portion, which are connected to the outer circumference of the third control ring 900 such that the third control ring 900 is movable in the shaft direction. The moving distance of the third control ring 900 is shown in FIGS. 5A through 5D.

Also, as shown in FIG. 2A, outer indent flutes 532 are formed at its outer portion of the outer flange 530 and a ratchet tooth ring 510 of the fixing housing 500 is forcibly fixed to the outer indent flutes 532.

As shown in FIGS. 2A and 2B, in the side wall of the flange portion of the fixing housing 500, a shaft hole 540 and a square hole 550 are formed piercing through the side wall. Here, a shaft of a lever gear 610 passes through the shaft hole 540 and the operation lever 600 is coupled to the shaft. Also, a stopper bar 810 of the second control ring 800 to be explained later passes through the square hole 550.

Figure 5A:
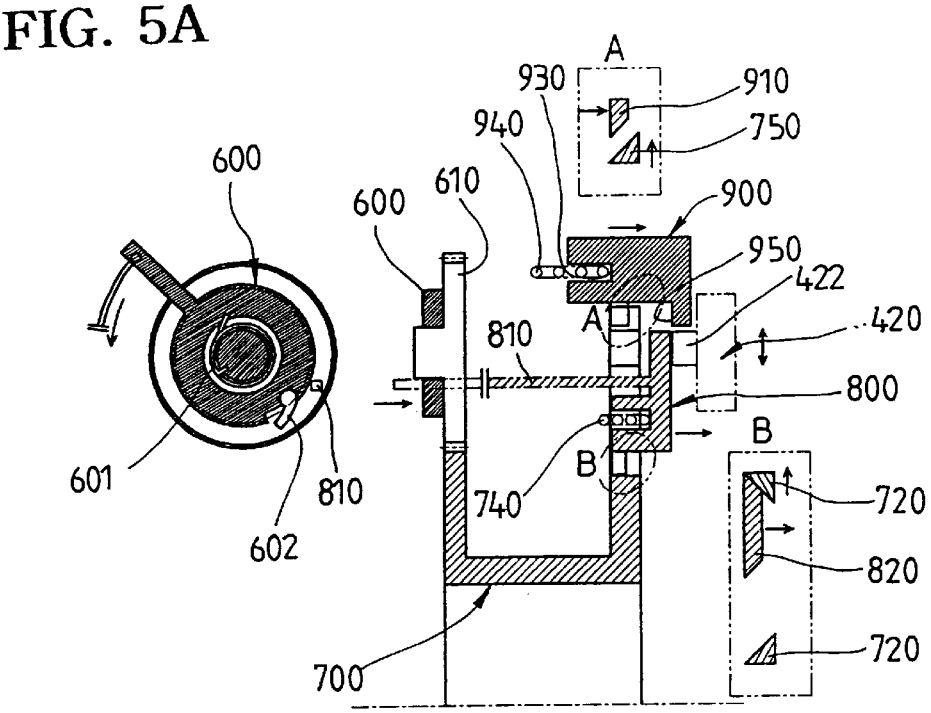
FIG. 5A is an enlarged view of the major portions of the controller for the changeable pedaling system, in a state of a conventional one-directional pedaling.

As shown in FIGS. 5A through 5D, the operation lever 600 is elastically supported by a spiral spring 601 which is elastically restorable against the shaft of the lever gear 610 such that the operation lever 600 is restorable to the initial position of FIG. 5A at all times.

Also, an elastic keeping protrusion 602 is formed at the circumference of the operation lever 600. Here, the elastic keeping protrusion 602 has the shape of a stopper such that the elastic keeping protrusion 602 is entangled with the stopper bar 810 of the second control ring 800 by elastic force applied to the operation lever 600 along its circumference by an elastic means (not shown).

The first control ring 700 has a partial gear portion 701 (see FIGS. 2A and 2B) which is engaged with the lever gear 610 to be rotatable as shown in FIG. 1 and FIGS. 5A through 5D, and divided flanges 710 along the inner circumference thereof. Also, inner slant protrusions 720 are formed at each end of the divided flanges 710, opposing each other with a predetermined interval such that two-sided slant protrusions 820 are located between the inner slant protrusions 720 of the divided flanges 710.

A spring binding slot 730 is formed in the first control ring 700 around the divided flange 710, and a coil spring 740 is coupled to the spring binding slot 730, such that the first control ring 700 is elastically connected with the second control ring 800.

Figure 5B:
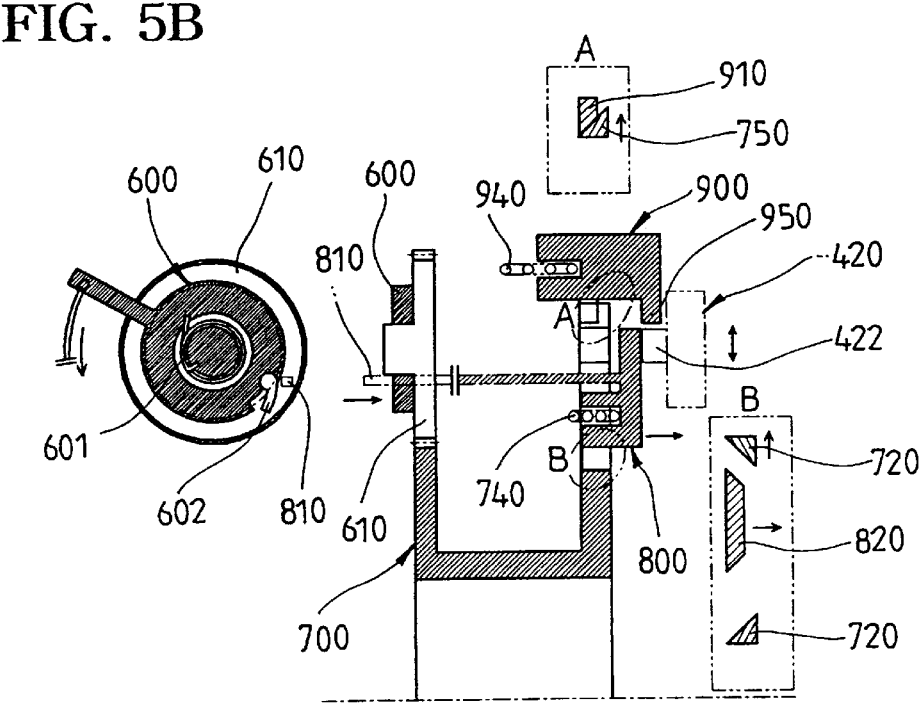
FIG. 5B is an enlarged view of the major portions of the controller for a changeable pedaling system, in a transient state into an automatic changing system.
Figure 5C:
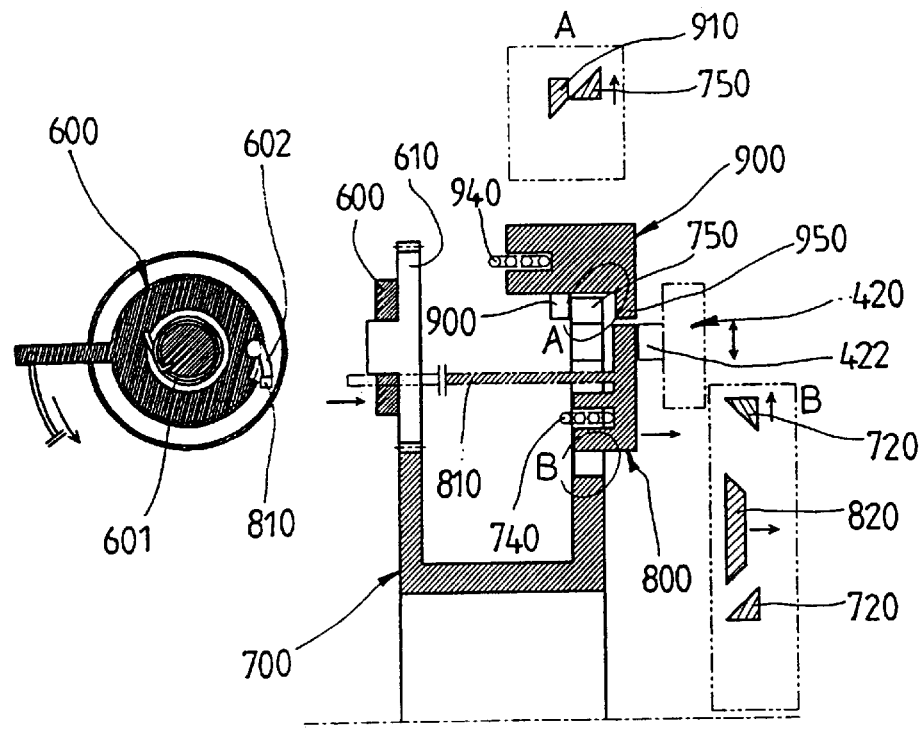
FIG. 5C is an enlarged view of the major portions of the controller for a changeable pedaling system, in the automatic changing system.
Figure 5D:
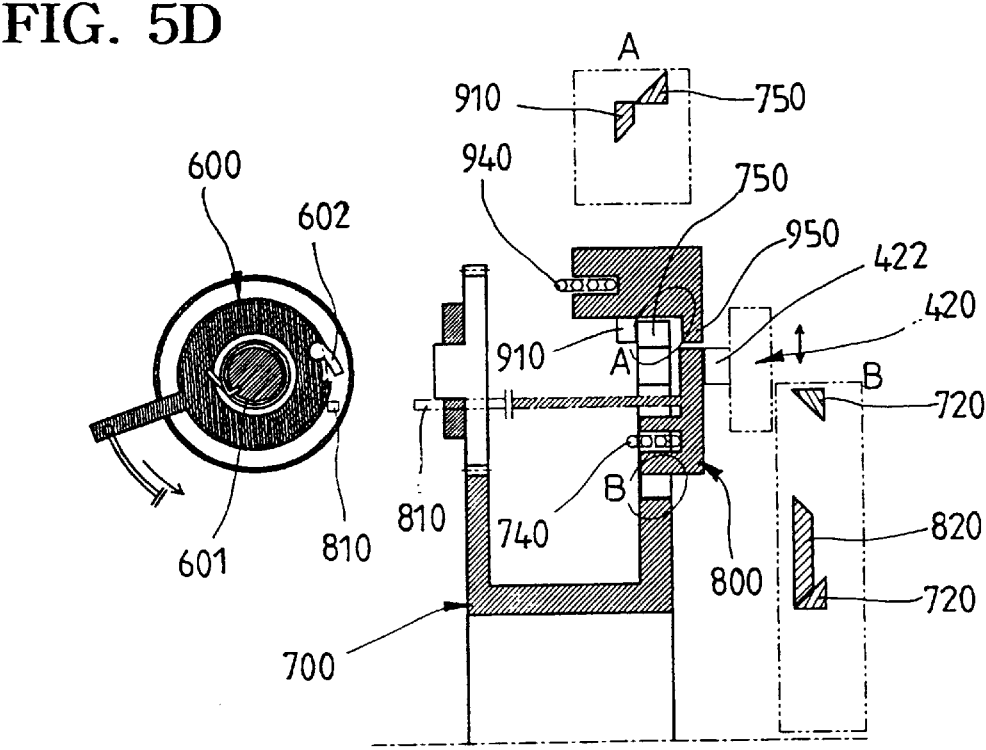
FIG. 5D is an enlarged view of the major portions of the controller for a changeable pedaling system, in a bi-directional pedaling system.
Figure 6:
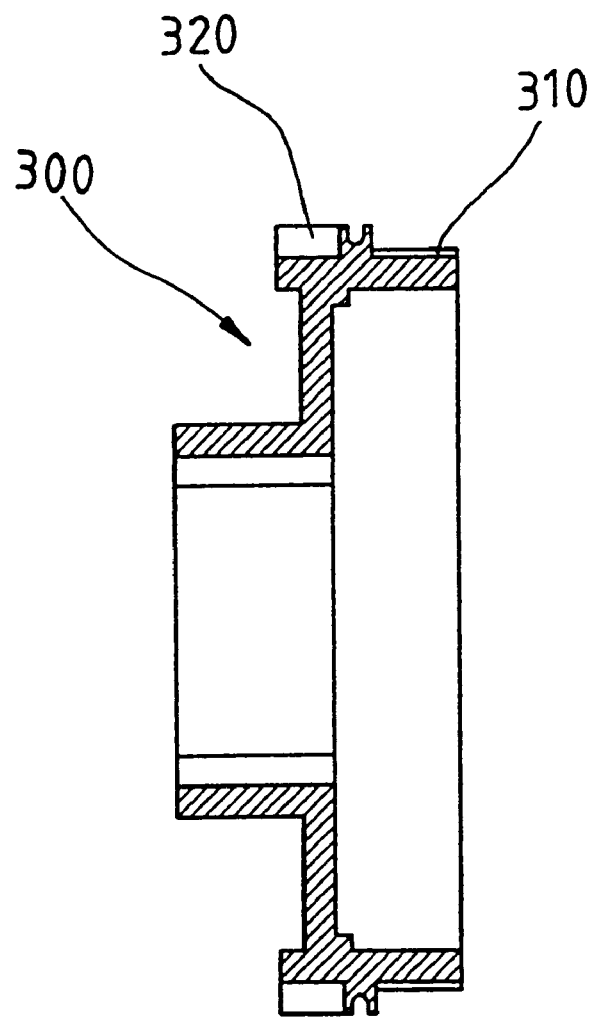
FIG. 6 is a sectional view of the sun gear of the controller for a changeable pedaling system.

Also, as shown in FIGS. 2A and 2B, outer slant protrusions 750 are formed along the outer flange of the first control ring 700 with a predetermined interval. The outer slant protrusions 750 are slidably connected to slipping slant protrusions 910 of the third control ring 900 to be explained later. As a result, the second control ring 800 can be connected to the third control ring 900 as shown in FIGS. 5C and 5D.

The second control ring 800 has a spring binding slot 830 along its inner circumference as shown in FIG. 2B, and the coil spring 740 is coupled to the spring binding slot 830 as described above, such that elastic force is applied to the second protrusion pin 422 of the changing stopper 420 of the carrier 400 against the first control ring 700 as shown in FIGS. 5A through 5D.

Binding protrusions 840 and two-sided slant protrusions 820 are formed alternately along the inner circumference of the second control ring 800 at a predetermined interval, while extending toward the center of the second control ring 800. The binding protrusions 840 are coupled with the slide flutes 522 formed in the inner flange 520 of the fixing housing 500, and the stopper bar 810 formed at the side of the second control ring 800 passes through the square hole 550 of the fixing housing at the same time. As a result, the second control ring 800 can be guided in the shaft direction, and the second control ring 800 and the first control ring 700 are coupled such that the two-sided slant protrusions 820 of the second control ring 800 are located between the inner slant protrusions 720 formed on the divided flanges 710 of the first control ring 700.

The binding protrusions 920 formed around the circumference of the third control ring 900 are coupled to the inner slide flutes 531 of the fixing housing 500 (see FIGS. 2A and 2B) such that the third control ring 900 is connected to the circumference of the second control ring 800 to be movable along the shaft direction. Also, the slipping slant protrusions 910 formed along the inner circumference of the third control ring 900 with a predetermined interval are slidably connected with the outer slant protrusions 750 of the first control ring 700 as shown in FIG. 5B.

Also, the spring binding slot 930 formed along the inner circumference of the third control ring 900 is coupled with the coil spring 940 such that elastic force is applied toward the changing stoppers 420 against the fixing housing 500.

A stopping protrusion 950 formed along the inner circumference of the third control ring 900 as shown in FIGS. 2A, 2B and 5A through 5D is coupled to the first control ring 700 such that rise of the changing stopper 420 upward is prevented.

The operation of the aforesaid driving mechanism of the bi-directional pedaling bicycle according to the present invention will now be described.

First, when driving the pedal shaft 100 forward in the state of FIG. 3, the sun gear 300 integrated with the pedal shaft 100 rotates forward. The first protrusion pins 421 of the changing stoppers 420 are coupled with the flutes 11 of the slide ring 10 connected with the sun gear 300 as shown in FIGS. 2B, 6, 7A and 7B, and the slide ring 10 is connected between the ratchet tooth portion 310 and the gear portion 320 of the sun gear 300 to be slidably rotatable. Thus, as the sun gear 300 rotates forward, the slide ring 10 also slidably rotates forward, so that each lower holding jaw 424 of the changing stoppers 420 of the carrier 400 is entangled with the ratchet tooth portion 310 of the sun gear 300. As a result, the carrier 400 rotates forward together with the sun gear 300.

Also, since the planetary gears 410 of the carrier 400 are engaged with the gear portion 320 of the sun gear 300 and the ring gear 220 of the sprocket binding housing 200, the carrier 400 rotates forward together with the sun gear 300, and accordingly the sprocket binding housing 200 rotates forward. Thus, forward driving force is transmitted to a rear wheel (not shown) of the bicycle, connected to the driving sprocket 210 of the sprocket binding housing 200 by a chain, thereby driving the bicycle forward.

In the above forward driving state, when driving the pedal shaft 100 rearward, the sun gear 300 rotates rearward. Here, the first protrusion pins 421 of the changing stoppers 420 are connected to the flutes 11 of the slide ring 10 coupled to the sun gear 300 as shown in FIGS. 2B, 6, 7A and 7B. Thus, together with the rearward rotation of the sun gear 300, the slide ring 10 slidably rotates rearward. As a result, the upper holding jaws 423 of the changing stoppers 420 of the carrier 400 are entangled with the ratchet tooth 511 of the fixing housing 500 as shown in FIG. 4, and accordingly the rotation of the carrier 400 stops.

The planetary gears 410 of the carrier 400 rotate forward while being engaged with the gear portion 320 of the sun gear 300, thereby rotating the ring gear 220 of the sprocket binding housing 200 forward. As a result, forward driving force is transmitted to a rear wheel of the bicycle, connected to the driving sprocket 210 of the sprocket binding housing 200 by a chain, thereby driving the bicycle forward.

The change of the pedaling system into the conventional one-directional pedaling system including idling, automatic changing system, and bi-directional pedaling system, which is caused from the entanglement and releasing of the changing stoppers 420 by using the operation lever 600, will now be described.

FIG. 5A is a diagram of the controller for changeable pedaling system, in the conventional one-directional pedaling system. In FIG. 5A, the operation lever 600 is in the initial state. As described above, the changing stoppers 420 are coupled with the flutes 11 of the slide ring 10 which slidably rotates together with the sun gear 300. Thus, as shown in FIG. 3, when the pedal shaft 100 rotates forward, the slide ring 10 slidably rotates forward and thus the changing stoppers 420 move downward to be entangled with the ratchet tooth portion 310 of the sun gear 300. Meanwhile, as shown in FIG. 4, when the pedal shaft 100 rotates rearward, the changing stoppers 420 move upward by the opposite operation to the above to be entangled with the ratchet tooth 511 of the fixing housing 500.

However, in the state of FIG. 5A, since the stopping protrusion 950 of the third control ring 900 is entangled with the second protrusion pins 422 of the changing stoppers 420, the upward movement of the changing stoppers 420 is prevented.

Thus, when rotating the pedal shaft 100 forward, the sprocket binding housing 200 rotates forward as described above, thereby driving the bicycle forward. However, when rotating the pedal shaft 100 rearward, the sun gear 300 rotates rearward, so that slant tooth of the ratchet tooth portion 310 of the sun gear 300 rotates over the changing stoppers 420 of the carrier, thereby idling the pedal shaft 100.

Here, in the state of FIG. 5A, one of the inner slant protrusions 720 formed in the first control ring 700 with a predetermined interval contacts the two-sided slant protrusions 820 of the second control ring 800, and at the same time the outer slant protrusions 750 of the first control ring 700 do not contact the slipping slant protrusions 910 of the third control ring 900. Thus, the third control ring 900 is shifted right (in FIG. 5A) by the elastic force of the coil spring 940, so that the stopping protrusion 950 of the third control ring 900 prevents the upward movement of the second protrusion pins 422 of the changing stoppers 420.

Thus, in the state of the changing stoppers 420 shown in FIG. 3, when driving the pedal shaft 100 rearward, the slant tooth of the ratchet tooth portion 310 of the sun gear 300 rotates over the lower holding jaw 424 of the changing stoppers 420 of the carrier 400, thereby idling the pedal shaft 100.

When the operation lever 600 starts to operate in the arrow direction (first stage) in the above state, the first control ring 700 engaged with the operation lever 600 rotates as shown in FIG. 5B, thus the connection between the inner slant protrusions 720 of the first control ring 700 and the two-sided slant protrusions 820 of the second control ring 800 is released. As a result, elastic force of the coil spring 740 is transmitted to the second control ring 800 being free.

Also, when the operation lever 600 operates in the first stage as shown in FIG. 5C, while the outer slant protrusions 750 of the first control ring 700 and the slipping slant protrusions 910 of the third control ring 900 contact each other, the outer slant protrusions 750 of the first control ring 700 slidably rotate beyond the slipping slant protrusions 910 of the third control ring 900 to be entangled therewith, so that the third control ring 900 pushed outside (right of FIG. 5C) by the coil spring 940 is pulled inside (left of FIG. 5C). Accordingly, the stopping protrusion 950 of the third control ring 900 is released from the entanglement by the second protrusion pins 422 of the changing stoppers 422.

The operation lever 600 is operated by a lever (not shown) attached to a handle of the bicycle, and the operation lever 600 returns to the initial state after one time of operation.

Thus, even though the second control ring 800 is pushed outside (right of FIG. 5C) by the elastic force of the coil spring 740 as shown in FIG. 5C, its shifting to the outside is prevented by contact with the second protrusion pins 422 of the changing stopper 420.

Also, when the first stage is performed, the elastic keeping protrusion 602 of the operation lever 600 electrically goes over the stopper bar 810 of the second control ring 800, so that the elastic keeping protrusion 602 is fixed being supported by the stopper bar 810 of the second control ring 800, thereby completing the change into the automatic changing system.

In this state, when continuing to drive the pedal shaft 100 forward by pedaling forward, as described above with reference to FIG. 3, the sun gear 300 rotates forward, thus the slide ring 100 also slidably rotates forward. As a result, the lower holding jaws 424 of the changing stoppers 420 of the carrier 400 are entangled with the ratchet tooth portion 310 of the sun gear 300, thereby integrally rotating the carrier 400 forward together with the sun gear 300.

In addition, the planetary gears 410 of the carrier 400 are engaged with the gear portion 320 of the sun gear 300 and the ring gear 220 of the sprocket binding housing 200, so that the sprocket binding housing 200 rotates forward as the carrier 400 rotates forward together with the sun gear 300. Thus, forward driving force is transmitted to a rear wheel connected to the driving sprocket 210 of the sprocket binding housing 200 by a chain, thereby driving the bicycle forward.

Then, when driving the pedal shaft 100 rearward, the sun gear 300 rotates rearward, so that the changing stoppers 420 move upward. As a result, the second control ring 800 supported by the second protrusion pins 422 of the changing stoppers 420 and the stopper bar 810 of the second control ring 800 are released being free, and then pushed outside by the elastic force of the coil spring 740.

Thus, the operation lever 600 entangled with the stopper bar 810 of the second control ring 800 by its elastic keeping protrusion 602 rotates rearward by the elastic restoring force of the spiral spring 601, thereby returning to the initial state.

Due to the return of the operation lever 600, the lever gear 610 of the operation lever 600 rotates rearward being engaged with the partial gear portion 701 of the first control ring 700, and then the third control spring 900 becomes free and the second control ring 800 moves inside in sequence.

When continuing to drive the pedal shaft 100 rearward, the third control ring 900 is being free. However, the third control ring 900 is held for a minute while being pushed inside by the second protrusion pins 422 of the changing stoppers 420.

Here, when driving the pedal shaft 100 forward in this state, the sun gear 300 rotates forward, so that the slide ring 10 moves the changing stoppers 420 toward the ratchet tooth portion 310 of the sun gear 300 (downward). Thus, the third control spring 900 pushed inside by the second protrusion pins 422 of the changing stoppers 420 is pushed outside by the elastic force of the coil spring 940.

That is, the pedaling system returns to the conventional one-directional pedaling system as shown in FIG. 5A.

When intending to change the pedaling system of the bicycle into the bi-directional pedaling system, that is, when further rotating the operation lever 600 in the state of FIG. 5C for the automatic changing system to be set to the second stage, while the first control ring 700 engaged with the operation lever 600 rotates, the inner slant protrusions 720 of the first control ring 700 maintain their contact with the two-sided slant protrusions 820 of the second control ring 800, so that the first control ring 700 constraints the second control ring 800.

Also, while the outer slant protrusions 750 of the first control ring 700 slidably go beyond the slipping slant protrusions 910 of the third control ring 900 to be entangled therewith, the outer slant protrusions 750 of the first control ring 700 locate at the side of the slipping slant protrusions 910 of the third control ring 900. Thus, the third control ring 900 pushed outside (right of FIG. 5D) by the coil spring 940 is pulled inside (left of FIG. 5D) as shown in FIG. 5D.

Thus, the stopping protrusion 950 of the third control ring 900 is forcibly released from the entanglement by the second protrusion pins 422 of the changing stoppers 420, thereby completing the change into the bi-directional pedaling system.

In this state, the second protrusion pins 422 of the changing stoppers 420 are released from the third control ring 900, so that the first protrusion pins 421 of the changing stoppers 420 are being free from the flutes 11 of the slide ring 10.

Thus, in the state of FIG. 5D, when driving the pedal shaft 100 forward, the sun gear 300 integrated with the pedal shaft 100 rotates forward as shown in FIG. 3. Here, since the first protrusion pins 421 of the changing stoppers 420 are coupled with the flutes 11 of the slide ring 10 connected with the sun gear 300 as shown in FIGS. 2B, 6, 7A and 7B, the sun gear 300 rotates the slide ring 10 forward. As a result, each lower holding jaw 424 of the changing stoppers 420 is entangled with the ratchet tooth portion 310 of the sun gear 300, thereby rotating the carrier 400 forward together with the sun gear 300.

Also, since the planetary gears 410 of the carrier 400 are engaged with the gear portion 320 of the sun gear 300 and the ring gear 220 of the sprocket binding housing 200, the carrier 400 rotates forward together with the sun gear 300, and accordingly the sprocket binding housing 200 rotates forward. Thus, forward driving force is transmitted to a rear wheel (not shown) of the bicycle, connected to the driving sprocket 210 of the sprocket binding housing 200 by a chain, thereby driving the bicycle forward.

In the above forward driving state, when driving the pedal shaft 100 rearward, the sun gear 300 rotates rearward. Here, the first protrusion pins 421 of the changing stoppers 420 are connected to the flutes 11 of the slide ring 10 coupled to the sun gear 300 as shown in FIGS. 2B, 6, 7A and 7B. Thus, together with the rearward rotation of the sun gear 300, the slide ring 10 slidably rotates rearward. As a result, the upper holding jaws 423 of the changing stoppers 420 of the carrier 400 are entangled with the ratchet tooth 511 of the fixing housing 500, and accordingly the rotation of the carrier 400 stops.

The planetary gears 410 of the carrier 400 rotate forward while being engaged with the gear portion 320 of the sun gear 300, thereby rotating the ring gear 220 of the sprocket binding housing 200 forward. As a result, forward driving force is transmitted to a rear wheel of the bicycle, connected to the driving sprocket 210 of the sprocket binding housing 200 by a chain, thereby driving the bicycle forward.

<Embodiment 2>

A controller for changeable pedaling system in a bi-directional pedaling bicycle according to the second embodiment of the present invention includes a sprocket binding housing 200, a sun gear 300 and a carrier 400 at one side of a pedal shaft 100 of a bicycle, which have the same structure as those of the first embodiment.

As shown in FIGS. 9 through 14, a fixing housing 500 has a cylindrical shape to be coupled with the sprocket binding housing 200. A cylindrical portion of the fixing housing 500 is rotatably connected to the pedal shaft 100 by bearings 101, has a slipping preventing means 102 such as spline at its outer circumference. First and second cylindrical fixing nuts 110 and 120 are connected to the cylindrical portion, and covered with a cylindrical cover 130. Also, such assembly is fitted by a fixing means 140 such as nut.

That is, the cylindrical portion of the fixing housing 500 is connected to the first and second cylindrical fixing nuts 110 and 120 which are closely coupled at each slant circumference 103, and such assembly is covered with the cylindrical cover 130 to be fixed to a frame (not shown) of the bicycle, which is the same as that of the first embodiment.

However, in this embodiment, an inner circumference 560 of a flange portion of the fixing housing 500, which has a shape of cylindrical cap and is integrally formed with the cylindrical portion, is rotatably coupled with a ratchet gear ring 570 having a ratchet tooth 571.

Figure 10:
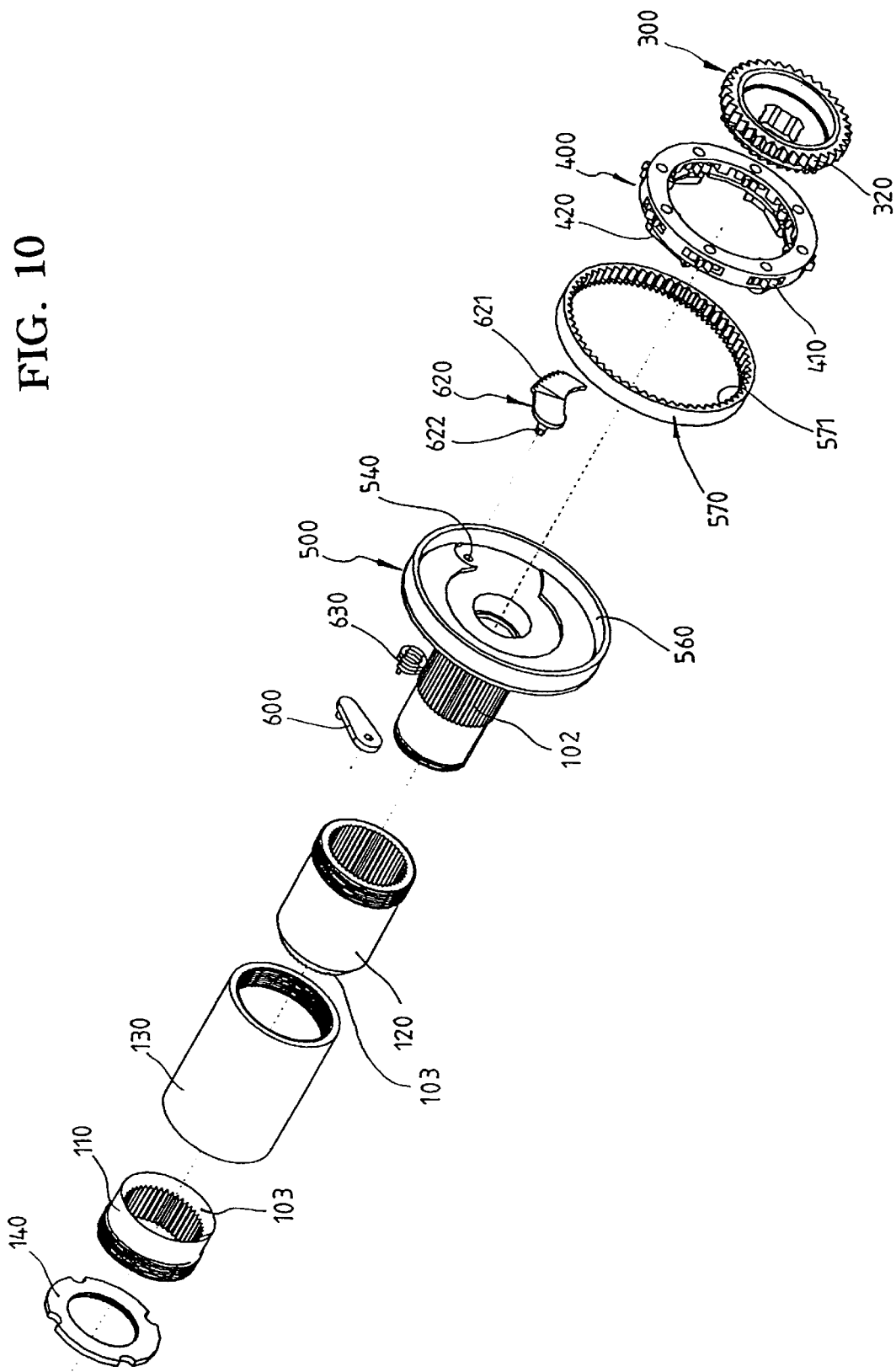
FIGS. 10 and 11 are exploded perspective views of the main portions of the controller shown in FIG. 9.
Figure 11:
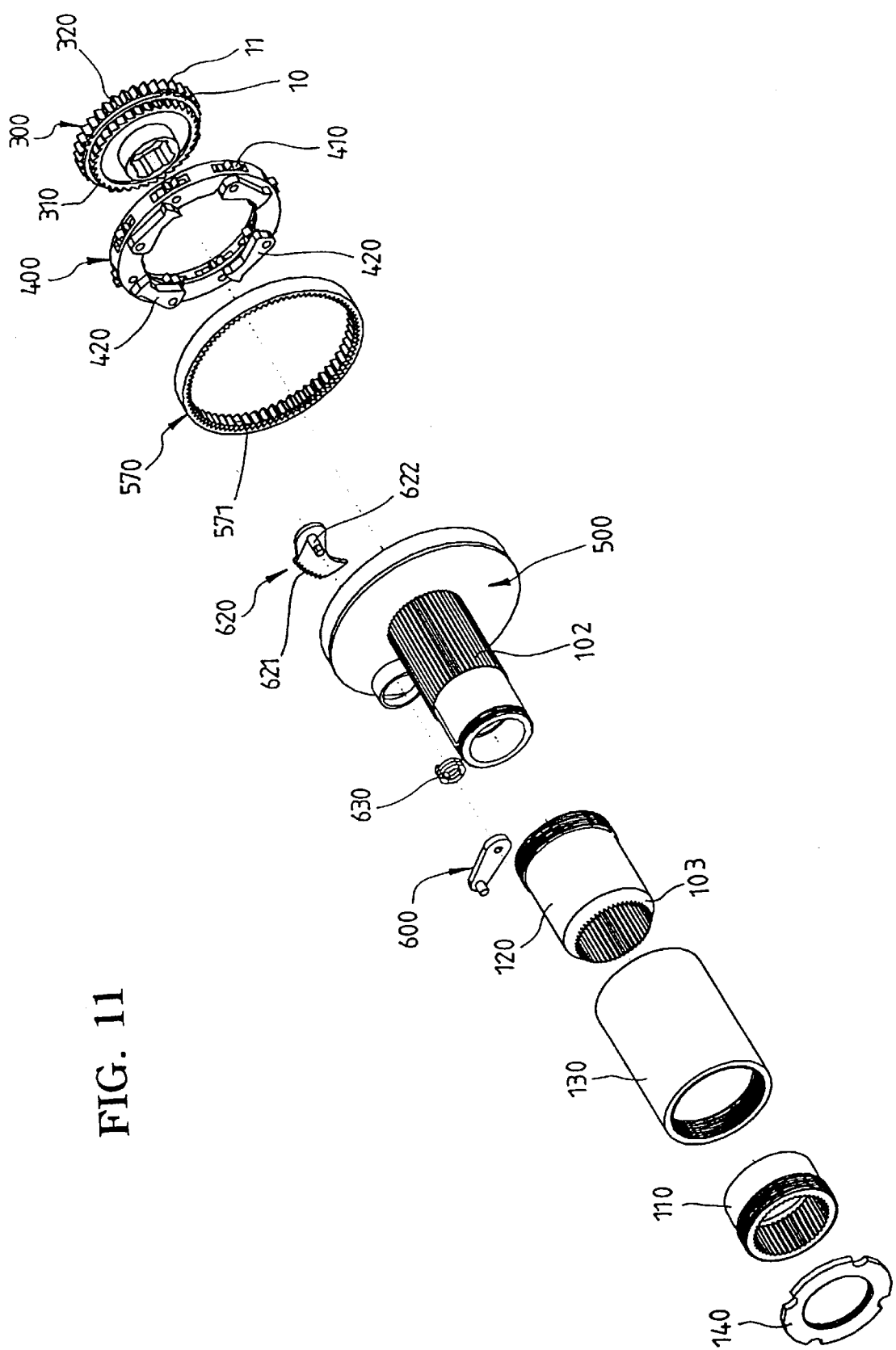

Also, as shown in FIGS. 10 and 11, a shaft hole 540 pierces through the side wall of the flange portion of the fixing housing 500, and a changing ratchet lever 620 is inserted into the shaft hole 540. The changing ratchet lever 620 is elastically and rotatably connected to an operation lever 600 by a spring 630, wherein the operation lever 600 is connected to an operation means operated by a rider.

The changing ratchet lever 620 has a shaft 622 to be rotatable being coupled with the shaft hole 540 and an arc-shaped ratchet tooth 621 integrally formed with the shaft 622 along the circumference. The ratchet tooth 621 is engaged with the ratchet tooth 571 of the ratchet gear ring 570, thereby fixing the ratchet gear ring 570 as shown in FIG. 13.

Also, the shaft 622 of the changing ratchet lever 620 is connected to the operation lever 600, and the operation lever 600 is elastically connected to the side wall of the fixing housing 500 by the spring 630. Thus, by the operation of the operation lever 600, the changing ratchet lever 620 is detachable from the ratchet gear ring 570 of the fixing housing 500.

Hereinafter, the operation mechanism of the controller for changeable pedaling system according to the second embodiment will be described.

Figure 9:
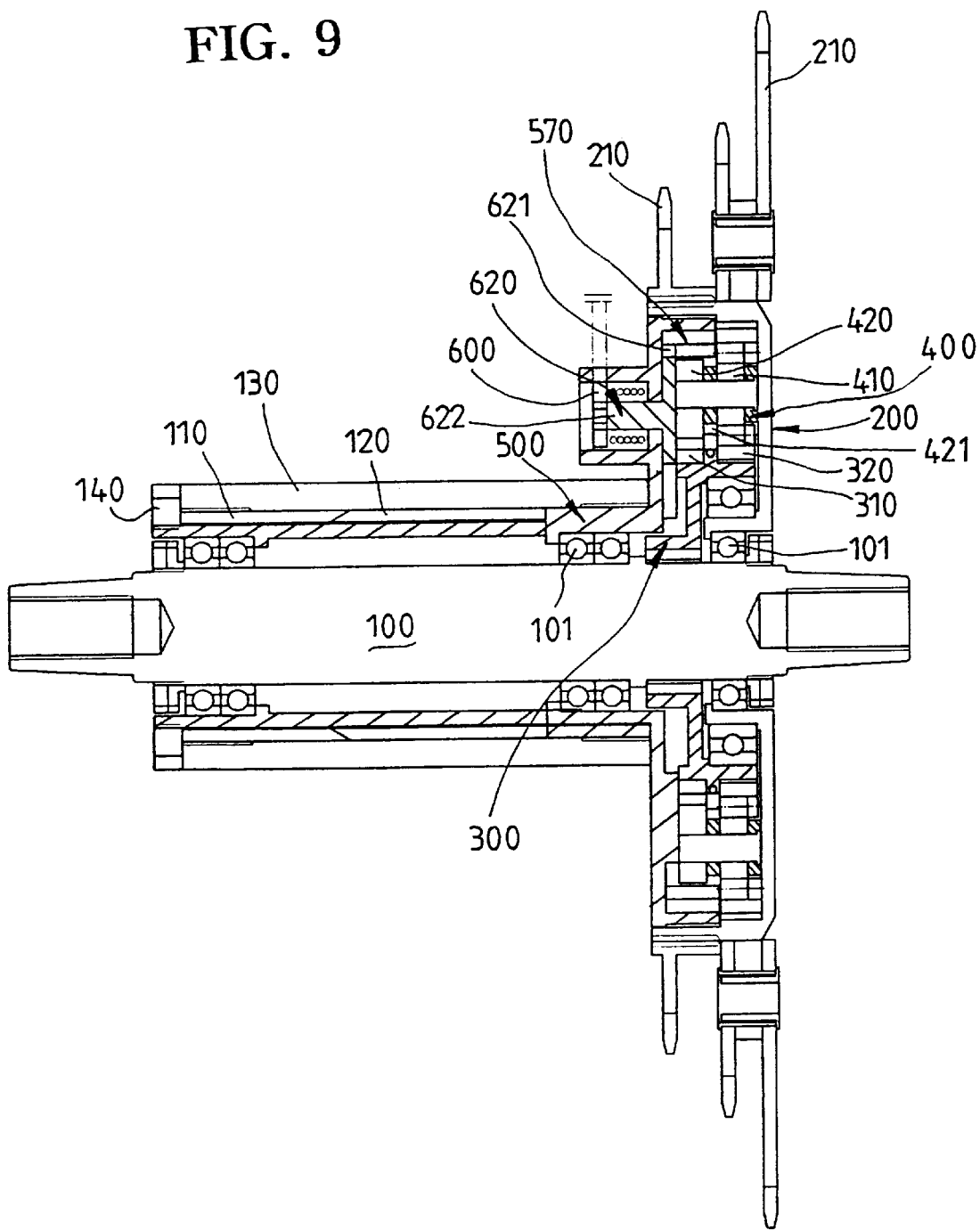
FIG. 9 is a section view of a controller for changeable pedaling system of a bi-directional pedaling bicycle according to another embodiment of the present invention.

FIG. 12 is a diagram of the controller of FIG. 9 in a forward pedaling system. When driving the pedal shaft 100 forward, the sun gear 300 rotates forward together with the pedal shaft 100. Here, first protrusion pins 421 of changing stoppers 420 are coupled with flutes 11 of a slide ring 10 connected with the sun gear 300 as shown in FIG. 11. Thus, as the sun gear 300 rotates forward, the slide ring 10 also rotates forward, so that each lower holding jaw 424 of the changing stoppers 420 of the carrier 400 is entangled with a ratchet tooth portion 310 of the sun gear 300. As a result, the carrier 400 comes to rotate forward together with the sun gear 300.

Also, since a plurality of planetary gears 410 of the carrier 400 are engaged with a gear portion 320 of the sun gear 300 and a ring gear 220 of the sprocket binding housing 200, the carrier 400 rotates forward together with the sun gear 300, and accordingly the sprocket binding housing 200 rotates forward. Thus, forward driving force is transmitted to a rear wheel (not shown) of the bicycle, connected to the driving sprocket 210 of the sprocket binding housing 200 by a chain, thereby driving the bicycle forward.

Here, the above forward pedaling travels the bicycle forward regardless of he changing stage of the operation lever 600.

In the above forward driving state, when intending to drive the bicycle forward by driving the pedal shaft 100 rearward, the ratchet gear ring 570 is fixed to the fixing housing 500 by engaging the ratchet tooth 621 of the changing ratchet lever 620 with the ratchet tooth 571 of the ratchet gear ring 570 by using the operation lever 600. Here, the first protrusion pins 421 of the changing stoppers 420 are connected to the flutes 11 of the slide ring 10 coupled to the sun gear 300. Accordingly, together with the rearward rotation of the sun gear 300, the slide ring 10 rotates rearward. As a result, the upper holding jaws 423 of the changing stoppers 420 of the carrier 400 are entangled with the ratchet tooth 571 of the ratchet gear ring 570 fixed by the changing ratchet lever 620, so that the rotation of the carrier 400 stops.

The planetary gears 410 of the carrier 400 rotate forward while being engaged with the gear portion 320 of the sun gear 300, thereby rotating the ring gear 220 of the sprocket binding housing 200 forward. As a result, forward driving force is transmitted to a rear wheel of the bicycle, connected to the driving sprocket 210 of the sprocket binding housing 200 by a chain, thereby driving the bicycle forward.

In addition, in the above forward driving state, when driving the pedal shaft 100 rearward while the ratchet tooth 621 of the changing ratchet lever 620 is separated from the ratchet tooth 571 of the ratchet gear ring 570 by using the operation lever 600, the first protrusion pins 421 of the changing stoppers 420 are connected to the flutes 11 of the slide ring 10 coupled to the sun gear 300. Accordingly, the slide ring 10 rotates rearward together with the sun gear 300. As a result, the upper holding jaws 423 of the changing stoppers 420 of the carrier 400 are entangled with the ratchet tooth 571 of the ratchet gear ring 570.

Thus, the ratchet gear ring 570 of the fixing housing 500 is released from the inner circumference 560 of the fixing housing 500, thereby idling the pedal shaft 100 and the carrier 400 together with the ratchet gear ring 570.

In the above state, when driving the pedal shaft 100 forward, the pedaling system of the bicycle returns to the state of FIG. 12, thereby driving the bicycle forward.

Industrial Applicability

As described above, the controller of the present invention can change the pedaling system of the bi-directional pedaling bicycle into the conventional one-directional pedaling system including idling, the automatic changing system, and the bi-directional pedaling system by using the operation lever.

That is, while the operation lever is not operated by a rider, control elements which operate being coupled with the operation lever constraint the changing stoppers of the carrier, so that the forward driving and idling of the bicycle can be achieved when driving the pedal shaft forward and rearward, respectively, as in the conventional bicycle.

While the operation lever is set to the first stage, the operation lever controls the control elements such that the changing stoppers of the carrier are released, thereby driving the bicycle forward by a forward pedaling. When driving the pedal shaft forward again after pedaling rearward once, the control elements returns to the initial state of the conventional one-directional pedaling system.

When the operation lever is set to the second stage, the operation lever controls the control elements such that the changing stoppers of the carrier are forcibly released, thereby driving the bicycle forward by pedaling rearward as well as forward. Here, the forward driving by the rearward pedaling is achieved by change in rotation direction of the planetary gears of the carrier.

Therefore, problems relating to the entanglement of the internal gears when pulling the bicycle backward, without rotation of the gears, can be solved, and the pedaling system can be smoothly changeable within a selection range by a rider, so that overloading onto a driving portion can be prevented.

What is claimed is:

1. A controller for a changeable pedaling system in a bicycle which includes a pedal shaft rotatable by pedaling, a sun gear rotatable together with the pedal shaft, a carrier having (1) a plurality of planetary gears to be engaged with the sun gear and (2) changing stoppers; a fixing housing having a ratchet tooth engageable with at least one of the changing stoppers of the carrier, and a sprocket binding housing connected to a sprocket to be engaged with the planetary gears of the carrier, said controller comprising:

said changing stoppers formed to be rotatable around fixing shafts arranged in the carrier, and each stopper having a first protrusion pin formed at one side of an end near the fixing shaft, and a second protrusion pin at an other side of the other end of said stopper;

a slide ring connected to the first protrusion pins of the changing stoppers and connected to the sun gear and being slidably rotatable, for engaging the changing stoppers of the carrier to the ratchet tooth of the fixing housing and a ratchet tooth portion of the sun gear according to the rotation of the sun gear;

an operation lever engaged with the shaft of a lever gear formed in one side of the fixing housing;

a first control ring having inner slant protrusions in an inner flange and outer slant protrusions in an outer flange thereof, said first control ring being rotatable and engaged with the lever gear;

a second control ring having a stopper bar controlling the operation lever and two-sided slant protrusions along an inner circumference thereof, the second control ring being elastically coupled to constrain the first control ring, thereby transmitting elastic force toward the second protrusion pins of the changing stoppers; and a third control ring having slipping slant protrusions in the inner circumference, the third control ring being installed to be horizontally movable by the first control ring to constrain the second protrusion pins of the changing stoppers, thereby preventing the changing stoppers from being engaged with the ratchet tooth of the fixing housing.

2. A controller for a changeable pedaling system in a bicycle as claimed in claim 1, wherein the fixing housing has a cylindrical portion connected to the pedal shaft by bearings, first and second cylindrical fixing nuts are connected to slipping preventing means formed along the outer circumference of the fixing housing, and the first and second cylindrical fixing nuts are enclosed by a cylindrical cover.

3. A controller for a changeable pedaling system in a bicycle as claimed in claim 1, wherein the operation lever is elastically coupled to the shaft of the lever gear by a spiral providing a rotatable restoring force, and has an elastic keeping protrusion along the circumference thereof such that the elastic keeping protrusion is entangled with the stopper bar of the second control ring.

4. A controller for a changeable pedaling system in a bicycle as claimed in claim 1, wherein the first control ring is formed to be rotatably engaged with the lever gear, and has inner slant protrusions arranged opposing each other with a predetermined interval such that the two-sided slant protrusions of the second control ring are placed therebetween, and outer slant protrusions arranged with a predetermined interval such that the outer slant protrusions constraint the third control ring with being slidably connected to the slipping slant protrusions of the third control ring.

5. A controller for a changeable pedaling system in a bicycle as claimed in claim 1, wherein the second control ring has a spring binding slot along the inner circumference thereof, and a coil spring is coupled to the spring binding slot such that elastic force is applied toward the second protrusion pins of the changing stoppers against the first control ring.

6. A controller for a changeable pedaling system in a bicycle as claimed in claim 1, wherein the third control ring is coupled to the outer circumference of the second control ring such that the slipping slant protrusions thereof are slidably connected to the outer slant protrusions of the first control ring, and has a spring binding slot around its inner circumference, wherein a coil spring is coupled to the spring binding slot such that elastic force is applied toward the changing stoppers against the fixing housing, and has a stopping protrusion around its inner circumference such that moving upward of the changing stoppers is prevented by the connection with the first control ring.

7. A controller for a changeable pedaling system in a bicycle as claimed in claim 1, wherein the first, second and third control rings, and the lever gear are coupled within the fixing housing.

8. A controller for a changeable pedaling system in a bicycle as claimed in claim 4, the first control ring is rotatably connected to the inner flange of the fixing housing.

9. A controller for a changeable pedaling system in a bicycle as claimed in claim 1, wherein the second control ring has binding protrusions formed along the inner circumference thereof, the binding protrusions being connected with slide flutes of the inner flange of the fixing housing to be slidable left and right, and the stopper bar of the second control ring pierces through a square hole of the fixing housing to constrain the elastic keeping protrusion of the operation lever.

10. In combination, a changeable pedaling system in a bicycle and a controller connected to operate said bicycle through interaction with said changeable pedaling system, including a pedal shaft rotatable by pedaling, a sun gear rotatable together with the pedal shaft, a carrier having (1) a plurality of planetary gears to be engaged with the sun gear and (2) changing stoppers; a fixing housing having a ratchet tooth engageable with at least one of the changing stoppers of the carrier, and a sprocket binding housing connected to a sprocket to be engaged with the planetary gears of the carrier, said controller comprising:

said changing stoppers formed to be rotatable around fixing shafts arranged in the carrier, and each stopper having a first protrusion pin formed at one side of an end near the fixing shaft, and a second protrusion pin at an other side of the other end of said stopper;

a slide ring connected to the first protrusion pins of the changing stoppers and connected to the sun gear and being slidably rotatable, for engaging the changing stoppers of the carrier to the ratchet tooth of the fixing housing and a ratchet tooth portion of the sun gear according to the rotation of the sun gear;

an operation lever engaged with the shaft of a lever gear formed in one side of the fixing housing;

a first control ring having inner slant protrusions in an inner flange and outer slant protrusions in an outer flange thereof, said first control ring being rotatable and engaged with the lever gear;

a second control ring having a stopper bar controlling the operation lever and two-sided slant protrusions along an inner circumference thereof, the second control ring being elastically coupled to constrain the first control ring, thereby transmitting elastic force toward the second protrusion pins of the changing stoppers; and a third control ring having slipping slant protrusions in the inner circumference, the third control ring being installed to be horizontally movable by the first control ring to constrain the second protrusion pins of the changing stoppers, thereby preventing the changing stoppers from being engaged with the ratchet tooth of the fixing housing.

* * * * *